June 30, 1953          E. LEVY, JR          2,644,126
INVERTER
Filed April 3, 1951
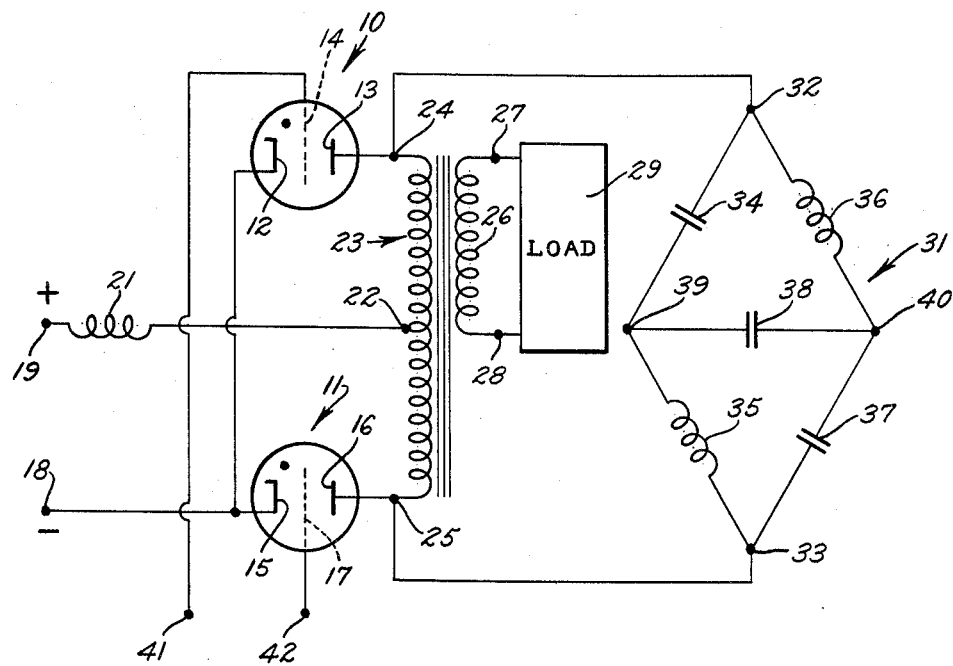
INVENTOR.
*Ernest Levy, Jr.*
BY
*ATTORNEY*

Patented June 30, 1953

2,644,126

UNITED STATES PATENT OFFICE 2,644,126

INVERTER

Ernest Levy, Jr., Bronx, N. Y., assignor to Sorensen & Company, Inc., Stamford, Conn., a corporation of Connecticut Application April 3, 1951, Serial No. 219,107

4 Claims. (Cl. 321—36)

This invention relates to electronic inverters and it relates more particularly to an inverter capable of providing alternating current voltages over a range of frequencies without changing the circuit parameters.

The process of converting direct current into alternating current is known as inversion and the electronic circuit used for the process is known as an inverter. Although conventional oscillators also convert direct current into alternating current, the power output is very low and hence the oscillations are not useful whenever a relatively high degree of power is required. The usual inverter therefore contains electronic tubes capable of handling a comparatively high degree of current. The gas-filled tube known as the thyratron is admirable for this purpose and in the conventional inverter circuit, two thyratrons are usually provided.

These thyratrons act as switches in that they alternately connect the ends of a center-tapped transformer to the negative terminal of a direct current power supply. The center-tap is, of course, connected to the positive terminal of the supply. The thyratrons are made to fire periodically by the application of a synchronizing voltage, or driving voltage as it is also known. These synchronizing oscillations need contain but very little power and hence may be derived from the output of a conventional vacuum tube oscillator. By varying the frequency of the input or synchronizing oscillations, the frequency of the alternating current output from the inverter may likewise be varied.

As is known in the art, once a thyratron fires, it cannot be extinguished merely by applying a negative voltage to the grid. Instead, it is necessary to either momentarily break the plate current supply or to put a negative potential on the plate. In the customary inverter, this is achieved by connecting a capacitor, known as a commutating capacitor, across the plates of the thyratrons. While one tube conducts the condenser charges to a certain value, then, when the second tube is rendered conductive by virtue of a positive cycle of synchronizing voltage on the grid, the positive terminal of the charged capacitor is, in effect, connected to the cathode of the first thyratron causing the first thyratron to be extinguished.

The correct size of the commutating capacitor depends upon numerous factors, one of which is the frequency of operation. If the frequency of operation is changed over a wide range, it necessitates a change in the effective value of said capacitance.

Hence, prior to the invention disclosed herein, the frequency range of any particular inverter was quite narrow and in order to have an inverter commutate properly at various frequencies, it was necessary to change the commutating capacitor.

It is, therefore, an object of the invention to provide an electronic inverter adapted to commutate over a relatively wide frequency range without changing any of the circuit parameters.

It is another object of the invention to provide an electronic inverter having a commutating reactance across the plates of the thyratrons where the capacitive component of the commutating reactance varies with the frequency.

The above and other objects of the invention will become apparent when taken in consideration with the following detailed description and by reference to the accompanying drawing. However, it is to be understood that the invention is not limited to the details disclosed but includes all variations and modifications as fall within the spirit of the invention and the scope of the appended claims.

In the drawing:

The figure represents a schematic diagram of one embodiment of the invention.

Referring to the drawing, the inverter includes two thyratrons 10 and 11. Thyratron 10 has a cathode 12, a plate 13 and a grid 14, while the thyratron 11 has a cathode 15, a plate 16 and a grid 17. The cathode 12 is directly connected to the cathode 15 which is in turn connected to a negative terminal 18 of a source of direct current potential.

A positive terminal 19 of the above mentioned direct current supply is connected through a commutating choke 21 to a center-tap terminal 22 of a transformer 23. One end terminal 24 of the transformer 23 is connected to the plate 13 and another end terminal 25 is connected to the plate 16 of the thyratrons 10 and 11, respectively. A secondary winding 26 of the transformer 23 has a pair of terminals 27 and 28 adapted to be connected to a suitable load 29.

A commutating reactance 31 having end terminals 32 and 33 is connected between the transformer terminals 24 and 25, respectively, which also places said reactance 31 between the plate 13 and the plate 16. The commutating reactance 31 comprises a Wheatstone type bridge having reactive components forming each of the arms. The bridge is formed by a capacitance 34 connected in series with an inductance 35, the combination being connected between the terminals 32 and 33 with the capacitance 34 connected to the terminal 32 and the inductance 35 to the terminal 33.

It also includes a second inductance 36 and a capacitance 37 serially connected thereto. The series combination is then also connected across the terminals 32 and 33 with the inductance 36 connected to the terminal 32 and the capacitance 37 to the terminal 33. A capacitor 38 is connected across the so-called output terminals of the bridge. In the present embodiment these are the terminals 39 and 40. Terminal 39 is formed by the junction of the capacitor 34 and the inductance 35 and terminal 40 is formed by the junction of the inductance 36 and the capacitor 37.

The provision of the commutating reactance 31 across the plates of the thyratrons 10 and 11 is unique and makes the inverter capable of providing an alternating current whose frequency can be changed over a wide range merely by changing the frequency of a synchronizing voltage which is supplied to the grids 14 and 17 through a pair of terminals 41 and 42. With this invention, it is not necessary to change any of the circuit parameters but the required capacitive reactance will automatically change with the frequency.

This may be understood when it is realized that in a resonant circuit containing an inductance and a capacitance, the circuit as a whole can be inductive or capacitive, depending upon the relative values of the inductance and capacitance and also depending on the frequency. This is likewise true in the case of the commutating reactance 31 where capacitance 34 and inductance 35 provide a series resonant circuit. Similarly, the inductance 36 and capacitance 37 provide another series resonant circuit and the two series circuits combine to form a parallel resonant circuit.

Assume, by way of example, that the output frequency of the inverter is fairly high. In that case, most of the current flowing through the bridge circuit will flow through the capacitance 34, then through capacitance 38 and the capacitance 37. Very little current will flow through the inductances 35 and 36. Thus, the capacitances 34, 38 and 37 are effectively in series and the reactance is capacitive and is quite high. Although the reactance of a single capacitance decreases with the frequency, the fact that the capacitances herein described are virtually in series at high frequencies, the capacitance of the combination is low and the reactance is quite high.

As the frequency is lowered, the relation changes inasmuch as more current will flow through the inductances 35 and 36. The capacitances 34, 38 and 37 are then no longer in series but rather form part of a series-parallel combination. The effect of this is to increase the capacity and reduce the capacitive reactance. Thus, by merely changing the frequency, the current relations between the various members of the bridge 31 change to vary the reactance. It is therefore evident that the circuit as herein described is capable of automatically changing the capacitive reactance with a change in frequency and can invert over a wide range of frequencies without changing any of the components included in the circuit. The only limits imposed on the frequency range are due to the characteristics of the gas thyratrons.

Thus, in other inverters, the capacitive reactance increases with a decrease in frequency but in the invention herein described, the capacitive reactance will change in the same direction as the frequency. For example, a decrease in frequency results in a decrease in the capacitive reactance.

Having thus set forth the nature of my invention, what I claim is:

1. An electronic inverter for converting direct current to alternating current the frequency of which may be varied over a relatively wide range without changing circuit components, said inverter including a transformer having a primary and a secondary, means for connecting one terminal of a source of direct current to substantially the center of said primary, a pair of gas-filled electronic tubes each having at least a plate, a cathode and a grid, the plate of one tube being connected to one end of said primary, the plate of the other tube being connected to the other end of said primary, means for applying a synchronizing alternating current voltage to the grids of said gas-filled tubes, and variable capacitive reactance means connected across said transformer, said reactance means including inductance means and capacitance means in series and series-parallel combination whereby if the frequency of said synchronizing voltage is changed the magnitude of said variable capacitive reactance will vary in the same direction.

2. An electronic inverter for converting direct current to alternating current the frequency of which may be varied over a relatively wide range without changing circuit components, said inverter including a transformer having a primary and a secondary, means for connecting one terminal of a source of direct current to substantially the center of said primary, a pair of gas-filled electronic tubes each having at least a plate, a cathode and a grid, the plate of one tube being connected to one end of said primary, the plate of the other tube being connected to the other end of said primary, means for applying a synchronizing alternating current voltage to the grids of said gas-filled tubes, and a bridge network having its input terminals connected across said transformer, said bridge network including inductance means and capacitance means the reactance of the bridge network being capacitive and variable with frequency whereby if the frequency of said synchronizing voltage is changed the magnitude of the capacitive reactance of said bridge network will vary in the same direction.

3. An electronic inverter for converting direct current to alternating current the frequency of which may be varied over a relatively wide range without changing circuit components, said inverter including a transformer having a primary and a secondary, means for connecting one terminal of a source of direct current to substantially the center of said primary, a pair of gas-filled electronic tubes each having at least a plate, a cathode and a grid, the plate of one tube being connected to one end of said primary, the plate of the other tube being connected to the other end of said primary, means for applying a synchronizing alternating current voltage to the grids of said gas-filled tubes, a Wheatstone type bridge network constructed so that the arms thereof which form a closed loop are alternately a first capacitance, a first inductance, a second capacitance and a second inductance, a third capacitance connected across the output terminals of said bridge, one side of said third capacitance being connected to the junction of said first capacitance and said first inductance, the other side of said third capacitance being connected to the junction of said second capacitance and said second inductance, the input terminal of said bridge which is formed by the junction of said first capacitance and said second inductance is connected to the plate of one of said gas-filled electronic tubes, the other input terminal which is formed by the junction of said first inductance and said second capacitance is connected to the plate of the other of said gas-filled electronic tubes whereby the reactance of said bridge network is capacitive and variable with frequency whereby if the frequency of said synchronizing voltage is changed the magnitude of the capacitive reactance of said bridge network will vary in the same direction.

4. An electronic inverter for converting direct current to alternating current the frequency of which may be varied over a relatively wide range without changing circuit components, said inverter including a transformer having a primary and a secondary, means for connecting one terminal of a source of direct current to substantially the center of said primary, electronic-tube switching means for alternately connecting the respective ends of said primary to the other terminal of said source of direct current, means for synchronizing said electronic-tube switching means at a predetermined frequency, a Wheatstone type bridge network constructed so that the arms thereof which form a closed loop are alternately a first capacitance, a first inductance, a second capacitance and a second inductance, a third capacitance connected across the output terminals of said bridge, one side of said third capacitance being connected to the junction of said first capacitance and said first inductance, the other side of said third capacitance being connected to the junction of said second capacitance and said second inductance, the pair of input terminals formed by the junction of said first capacitance and said second inductance and the junction of said first inductance and said second capacitance are connected across said transformer, whereby the reactance of said bridge network is capacitive and variable with frequency whereby if said predetermined frequency is changed the magnitude of the capacitive reactance of said bridge network will vary in the same direction.

ERNEST LEVY, JR.

References Cited in the file of this patent

UNITED STATES PATENTS

| Number | Name | Date |
|---|---|---|
| 1,723,888 | Prince | Aug. 6, 1929 |
| 2,009,833 | Bedford | July 30, 1935 |
| 2,036,844 | Willis | Apr. 7, 1936 |
| 2,159,827 | Westendorp | May 23, 1939 |
| 2,443,100 | Edwards | June 8, 1948 |